UNITED STATES PATENT OFFICE.

FELIX KAUFLER, OF TRAISKIRCHEN, AUSTRIA-HUNGARY, ASSIGNOR TO THE FIRM OF BOSNISCHE ELEKTRICITATS-ACTIENGESELLSCHAFT, OF VIENNA, AUSTRIA-HUNGARY.

PROCESS FOR THE PREPARATION OF ACETIC-ACID ANHYDRID.

1,152,098.      Specification of Letters Patent.      Patented Aug. 31, 1915.

No Drawing.      Application filed November 25, 1914. Serial No. 873,941.

*To all whom it may concern:*

Be it known that I, FELIX KAUFLER, subject of the Emperor of Austria-Hungary, residing at Traiskirchen, Austria-Hungary, have invented certain new and useful Improvements in Processes for the Preparation of Acetic-Acid Anhydrid, of which the following is a specification.

The present invention relates to a process for the preparation of acetic acid anhydrid from ethylidene diacetate.

According to the indications contained in the scientific literature the acetic acid ethers of the lower members of the series of aliphatic aldehydes are chemical compounds of a rather constant character; the said acetic acid ethers are described to be liquids boiling without decomposition and which may even be purified by means of distillation (see for instance Beilstein, *Handbuch der Organischen Chemie*, 3rd edition, volume 1, page 925, line 20 from the bottom). Thorough investigations have shown however that the molecule of these compounds may be split up without difficulty. In particular ethylidene diacetate is decomposed according to the equation:

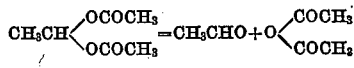

into acetic aldehyde and acetic acid anhydrid by merely heating it in a liquid or in a vaporous state to a temperature sufficiently above its boiling point (169°). The said reaction is favored by the presence of catalyzers as they accelerate the progress of the decomposition. Moreover the catalyzers enable the decomposition to be carried out at a temperature at which no decomposition is obtained in the absence of contact substances.

Example I: 100 g. of ethylidene diacetate in a vaporous condition are led through a tube heated to 250°–300° C. and filled with pumice stone or other filling bodies, for instance with copper chips. For every liter of the volume of the tube 70 g. of ethylidene diacetate should pass in one hour. The vapors leaving the tube are subjected to a cooling action. The condensed liquid shows the following composition: acetic aldehyde 25.3%, glacial acetic acid 17.1% (formed by secondary reaction), ethylidene diacetate 7%, acetic acid anhydrid 49%. This mixture may be separated into its constituents by fractionation, care being taken to employ an efficient column apparatus especially in separating ethylidene diacetate from acetic acid anhydrid. Finally about 43 g. commercially pure acetic acid anhydrid are obtained. The remainder contained in the fraction consisting of ethylidene diacetate is employed together with the latter as primary matter for the next charge.

Example II: 70 g. of ethylidene diacetate are heated in an autoclave during one hour to about 250° C. After this degree of temperature has been reached a raising of the pressure indicates the beginning of the splitting up reaction. The acetic aldehyde formed is blown off at the same rate that it is formed, whereas the remainder is distilled off from the autoclave after the raising of the pressure ceases. In one specific case the first fraction (26.4 g.) consisted of 59% of acetic aldehyde; besides it contained 12% of acetic acid anhydrid and 11.6% of ethylidene diacetate, the remainder being principally glacial acetic acid. The examination of the second fraction (39.5 g.) showed 8.5% of ethylidene diacetate, 58% of acetic acid anhydrid and 26% of glacial acetic acid. The separation of the several components was carried out in the same way as in the first example.

Example III: 100 g. of ethylidene diacetate are heated with 5 g. of bisulfate of potassium in a still, provided with a high reflux-cooler, in such a manner that the liquid is maintained slightly boiling and the main portion of the ethylidene diacetate flows back again into the vessel, whereas the products of the splitting up reaction are flowing into an inclined cooler, where they are condensed. The condensed product contains 24.5% of acetic acid anhydrid and is freed from aldehyde and ethylidene diacetate carried along with the vapors by fractionation. The ethylidene diacetate which has remained unaltered is led back into the vessel where the splitting up reaction is carried through. In consideration of this recuperation, the yield calculated is about 80%.

Example IV: 100 g. ethylidene diacetate are heated with 1 g. of concentrated sulfuric acid as described in Example III. The distillate contains 7% of acetic acid anhydrid; by separating the latter by means of fractionation and by continuously leading back again the generated ethylidene diacetate into the reaction vessel, for further treatment in the same manner, the product is very rapidly obtained.

Example V: 100 g. of ethylidene diacetate are heated with 15 g. of mercuric sulfate as described in Example III. The distillate contains 76% of acetic acid anhydrid and is worked up in the manner hereinbefore described.

Claims:

1. The method of obtaining acetic anhydrid, which comprises heating ethylidene diacetate to a temperature sufficient to split off acetic anhydrid.

2. The method of obtaining acetic anhydrid, which comprises heating ethylidene diacetate in the presence of a catalyzer to a temperature sufficient to split off acetic anhydrid.

3. The method of obtaining acetic anhydrid, which comprises heating ethylidene diacetate to a temperature above its boiling point sufficient to split off acetic anhydrid.

4. The method of obtaining acetic anhydrid, which comprises heating ethylidene diacetate in the presence of a catalyzer to a temperature sufficiently above its boiling point to split off acetic anhydrid.

In testimony whereof I have hereunto set my hand in presence of two subscribing witnesses.

DR. FELIX KAUFLER.

Witnesses:
  JOSEF RUBSACH,
  AUGUST FUGGER.